United States Patent
Okamura et al.

(10) Patent No.: US 7,964,652 B2
(45) Date of Patent: Jun. 21, 2011

(54) EXPANDABLE POLYETHYLENE RESIN PARTICLE AND METHOD FOR PRODUCTION THEREOF

(75) Inventors: Kazuki Okamura, Ichihara (JP); Hiroshi Nakaguki, Ichihara (JP)

(73) Assignee: JSP Corporation, Tokyo (JP)

( * ) Notice: Subject to any disclaimer, the term of this patent is extended or adjusted under 35 U.S.C. 154(b) by 268 days.

(21) Appl. No.: 12/302,311

(22) PCT Filed: May 22, 2007

(86) PCT No.: PCT/JP2007/060396
§ 371 (c)(1),
(2), (4) Date: Nov. 25, 2008

(87) PCT Pub. No.: WO2007/138916
PCT Pub. Date: Dec. 6, 2007

(65) Prior Publication Data
US 2009/0186954 A1    Jul. 23, 2009

(30) Foreign Application Priority Data

May 26, 2006  (JP) ................................ 2006-146203

(51) Int. Cl.
*C08J 9/18* (2006.01)
*C08J 9/00* (2006.01)
*C08J 9/16* (2006.01)

(52) U.S. Cl. ................. 521/60; 521/50; 521/56
(58) Field of Classification Search .............. 521/56, 521/50
See application file for complete search history.

(56) References Cited

U.S. PATENT DOCUMENTS

| | | | |
|---|---|---|---|
| 4,097,554 A | 6/1978 | Yui et al. | |
| 5,326,627 A * | 7/1994 | Yazaki et al. | 428/116 |
| 6,908,949 B2 * | 6/2005 | Arch et al. | 521/59 |
| 2006/0058406 A1 | 3/2006 | Matsumura et al. | |
| 2006/0063847 A1 * | 3/2006 | Matsumura et al. | 521/82 |
| 2006/0217452 A1 * | 9/2006 | Inada et al. | 521/142 |
| 2007/0249784 A1 | 10/2007 | Matsumura et al. | |

FOREIGN PATENT DOCUMENTS

| | | |
|---|---|---|
| JP | 45-32623 | 10/1970 |
| JP | 48-101457 | 12/1973 |
| JP | 49-005473 | 1/1974 |
| JP | 49-5473 | 1/1974 |
| JP | 49-097884 | 9/1974 |
| JP | 50-136167 | 11/1975 |
| JP | 50-139167 | 11/1975 |
| JP | 52-032990 | 3/1977 |
| JP | 57-197119 | 12/1982 |
| JP | 59-018714 | 1/1984 |
| JP | 62-059642 | 3/1987 |
| JP | 01-284536 | 11/1989 |
| JP | 04-220439 | 8/1992 |
| JP | 07-179647 | 7/1995 |
| JP | 2006-088456 | 4/2006 |

OTHER PUBLICATIONS

International Preliminary Report on Patentability issued Dec. 24, 2008, in Application No. PCT/JP2007/060396.
International Search Report mailed Jun. 19, 2007, in Application No. PCT/JP2007/060396.

* cited by examiner

*Primary Examiner* — RAndy Gulakowski
*Assistant Examiner* — Kara Negrelli
(74) *Attorney, Agent, or Firm* — Antonelli, Terry, Stout & Kraus, LLP.

(57) ABSTRACT

Disclosed is a method for production of an expandable polyethylene resin particle having a foaming agent impregnated therein, which comprises polymerizing a styrene monomer or a monomer mixture containing a styrene monomer onto a nuclear particle comprising an ethylene-vinyl acetate copolymer and a linear low-density polyethylene.

16 Claims, No Drawings

EXPANDABLE POLYETHYLENE RESIN PARTICLE AND METHOD FOR PRODUCTION THEREOF

TECHNICAL FIELD

The invention relates to an expandable polyethylene resin particle, a method for producing the same, an expanded polyethylene bead and an expanded polyethylene resin molded product.

BACKGROUND ART

As compared with expanded polystyrene resin molded products, expanded polyethylene resin molded products are excellent in impact resistance, and restoring force such as deflection and repeated stress-strain. Due to these characteristics, expanded polyethylene resin molded products are widely used as a packing material of precise components or heavy products. In addition, since expanded polyethylene molded products are excellent in heat resistance and oil resistance, they are widely used as automobile components such as impact absorbers, bumpers and floor spacers.

Expandable polyethylene resin particles obtained by impregnating a polyethylene resin with a foaming agent are known. Polyethylene, however, tends to allow a foaming agent to pass therethrough. Therefore, several hours after the production, a foaming agent scatters, resulting in a significant decrease in foaming properties. Accordingly, it is required to subject such expandable polyethylene resin particles to a preliminary foaming shortly after the production to obtain expanded particles. For this reason, it is necessary to provide a preliminary foaming machine or a molding machine near a foaming agent impregnation equipment, which results in the restriction of the production base. Accordingly, transportation expenses of foamed particles or molded products are expensive, resulting in an economical disadvantage.

In addition, expanded olefin resin molded products are poor in compressive strength as compared with an expanded styrene resin molded product. Therefore, it is required that expanded olefin resin molded products have an expansion ratio lower than those of expanded polystyrene resin molded products. Accordingly, expanded olefin resin molded products are disadvantageous in costs as compared with expanded styrene resin molded products.

As a method for solving these problems, a method is proposed in which a cross-linking agent is added to polyethylene resin particles, and the resulting mixture is heated in a dispersion medium composed of water, low-boiling-point alcohols and ketones to allow the polyethylene resin particles to be cross-linked while the dispersion medium is impregnated into the cross-linked resin particles as a foaming agent (Patent Document 1).

In addition, many methods have been proposed in which a vinyl aromatic monomer in which a polymerization initiator and a cross-linking agent are dispersed is impregnated into polyethylene resin particles to conduct polymerization and cross linking, thereby obtaining modified polyethylene resin particles (Patent Documents 2 to 7).

Patent Document 1: JP-A-S50-139167
Patent Document 2: JP-A-S52-32990
Patent Document 3: JP-B-S45-32623
Patent Document 4: JP-A-H01-284536
Patent Document 5: JP-A-S48-101457
Patent Document 6: JP-A-S49-5473
Patent Document 7: JP-A-S49-97884

However, the method disclosed in Patent Document 1 has the disadvantage that foaming properties are significantly low, although a foaming agent can be reliably retained. That is, low-boiling-point alcohols or ketones do not function well as the foaming agent of polyethylene resin particles.

On the other hand, in the methods disclosed in Patent Documents 2 to 7, although retainability of a foaming agent and strength of an expanded molded product are improved by increasing the ratio of a vinyl aromatic monomer to polyethylene resin particles, it is required to increase significantly the ratio of a vinyl aromatic monomer to obtain a sufficient retainability of a foaming agent. As a result, impact resistance and restoring force such as deflection and repeated stress-strain, which are characteristics of polyethylene, cannot be obtained.

An object of the invention is to provide an expandable polyethylene resin particle which is improved in a long-term foam moldability, and an expanded polyethylene resin molded product which can exhibit high strength while keeping impact resistance and restoring force such as deflection and repeated stress-strain, which are characteristics of an expanded olefin resin molded product.

DISCLOSURE OF THE INVENTION

As a result of extensive studies, the inventors have found that an expandable polyethylene resin particle obtained by polymerizing a styrene monomer in the presence of a nucleus particle containing specific components, and impregnating the resulting particle with a foaming agent has improved retainability of a foaming agent and foaming properties, and has found that it is possible to obtain an expanded molded product having a high strength using these expandable particles. The invention has been made based on these findings.

According to the invention, the following expandable polyethylene resin particle, etc. are provided.

1. A method for producing an expandable polyethylene resin particle, which comprises the steps of:
   polymerizing a styrene monomer or a monomer mixture containing a styrene monomer to a nucleus particle comprising an ethylene-vinyl acetate copolymer and a linear low-density polyethylene, and
   impregnating the resultant particle with a foaming agent.

2. The method for producing an expandable polyethylene resin particle according to 1, wherein
   the ethylene-vinyl acetate copolymer has a density of 0.95 or lower, a melt mass flow rate of 1.5 to 4.0 g/10 min and a vicat softening temperature of 60 to 110° C., and
   the content of vinyl acetate in the ethylene-vinyl copolymer is 3 to 20 wt %.

3. The method for producing an expandable polyethylene resin particle according to 1 or 2, wherein
   the linear low-density polyethylene has a density of 0.94 or lower, a melt mass flow rate of 1.5 to 4.0 g/10 min and a vicat softening temperature of 80 to 120° C.

4. The method for producing an expandable polyethylene resin particle according to any one of 1 to 3, wherein
   the nucleus particle further comprises an acrylonitrile-styrene copolymer.

5. The method for producing an expandable polyethylene resin particle according to 4, wherein
   the acrylonitrile-styrene copolymer has a weight-average molecular weight of 70,000 to 400,000.

6. The method for producing an expandable polyethylene resin particle according to 4 or 5, wherein
   the nucleus particle essentially consists of, in 100 wt % in total,
   the ethylene-vinyl acetate copolymer of 10 to 80 wt %, the linear low-density polyethylene of 10 to 80 wt % and the acrylonitrile-styrene copolymer of 1 to 50 wt %.

7. The method for producing an expandable polyethylene resin particle according to any one of 1 to 6, wherein the weight ratio of the nucleus particle per the styrene monomer or the monomer mixture is 10/90 to 60/40.

8. The method for producing an expandable polyethylene resin particle according to any one of 1 to 7, wherein a polymerization initiator and a cross-linking agent are previously dispersed in the styrene monomer or the monomer mixture.

9. The method for producing an expandable polyethylene resin particle according to any one of 1 to 8, wherein the styrene monomer or the monomer mixture is a combination of styrene and butyl acrylate.

10. The method for producing an expandable polyethylene resin particle according to 9, wherein the expandable polyethylene resin particle contains butyl acrylate in a ratio of 0.5 to 10 wt %.

11. The method for producing an expandable polyethylene resin particle according to any one of 1 to 10, wherein the nucleus particle has a particle diameter of 0.1 to 3.0 mm.

12. An expandable polyethylene resin particle obtainable by the method for producing an expandable polyethylene resin particle according to any one of 1 to 11.

13. An expandable polyethylene resin particle, which comprises a polymer of an ethylene-vinyl acetate copolymer, a linear low-density polyethylene, and a styrene monomer or a monomer mixture containing a styrene monomer, and is impregnated with a foaming agent.

14. The expandable polyethylene resin particle according to 13, further comprising an acrylonitrile-styrene copolymer.

15. The expandable polyethylene resin particle according to 14, which consists of 10 to 80 wt % of the ethylene-vinyl acetate copolymer, 10 to 80 wt % of the linear low-density polyethylene, and 1 to 50 wt % of the acrylonitrile-styrene copolymer, relative to the total of these components of 100 wt %, and in which the weight ratio of the total amount of these components per the polymer of the styrene monomer or the monomer mixture is 10/90 to 60/40.

16. The expandable polyethylene resin particle according to any one of 13 to 15, wherein the polymer of the styrene monomer or the monomer mixture is a copolymer of styrene and butyl acrylate.

17. An expanded polyethylene bead obtainable by foaming the expandable polyethylene resin particle according to any one of 12 to 16.

18. A polyethylene resin molded product obtainable by foam-molding the expandable polyethylene resin particles according to any one of 12 to 16 or the expanded polyethylene beads according to 17.

The invention provides an expandable polyethylene resin particle capable of maintaining foam moldability, as well as a polyethylene resin foam-molded product which is excellent in strength.

BEST MODE FOR CARRYING OUT THE INVENTION

The expandable polyethylene resin particle of the invention contains an ethylene-vinyl acetate copolymer, a linear low-density polyethylene, and a polymer of a styrene monomer or a monomer mixture containing a styrene monomer (hereinafter often referred to as a "styrene monomer or the monomer mixture"), and is impregnated with a foaming agent.

Specifically, the expandable polyethylene resin particle has a nucleus comprising an ethylene-vinyl acetate copolymer and a linear-low density polyethylene and a polymer of a styrene monomer or the monomer mixture around the nucleus, and is impregnated with a foaming agent.

The expandable polyethylene resin particle of the invention may further contain an acrylonitrile-styrene copolymer.

Specifically, the expandable polyethylene resin particle comprises a nucleus comprising an ethylene-vinyl acetate copolymer, a linear low-density polyethylene and an acrylonitrile-styrene copolymer, and, around this nucleus, a polymer of a styrene monomer or the monomer mixture, and is impregnated with a foaming agent.

As examples of the styrene monomer and the monomer mixture, a styrene homopolymer, a copolymer of styrene and an acrylic monomer (e.g. styrene and butyl acrylate), etc. can be given.

The expandable polyethylene resin particle of the invention can be produced by polymerizing a styrene monomer or the monomer mixture in the presence of a nucleus particle containing an ethylene-vinyl acetate copolymer and a linear low-density polyethylene, or an ethylene-vinyl acetate copolymer, a linear low-density polyethylene and a styrene-acrylonitrile copolymer, and by impregnating the resultant particle with a foaming agent.

The polyethylene resin to be used as the nucleus particle contains an ethylene-vinyl acetate copolymer and a liner low-density polyethylene.

An ethylene-vinyl acetate copolymer is a polymer obtained by copolymerizing ethylene and vinyl acetate, for example, by high-pressure radical polymerization. In general, an ethylene-vinyl acetate copolymer has a branched structure of a long-chain polyethylene and a short chain derived from vinyl acetate. As for the content of the vinyl acetate (ratio of the structure derived from the vinyl acetate monomer in the copolymer), a copolymer having the vinyl acetate content of 1 to 45 wt % is generally known. The vinyl acetate content of 3 to 20 wt % is preferable, with 5 to 15 wt % being more preferable. If the vinyl acetate content is less than 3 wt %, the resultant expandable polyethylene resin particles tend to have a decreased tensile breaking stress. The vinyl acetate content exceeding 20 wt % causes the resulting expandable polyethylene resin particle to have a high-degree of fugacity.

The density ($g/cm^3$) of an ethylene-vinyl acetate copolymer is normally about 0.90 to 0.96. The density of an ethylene-vinyl acetate copolymer of 0.95 or lower is preferable in view of foaming properties and moldability, particularly for moldability. The density of an ethylene-vinyl acetate copolymer is more preferably 0.94 or lower.

The melt mass flow rate of the ethylene-vinyl acetate copolymer is preferably 1.5 to 4.0 g/10 min in respect of extrusion conditions at the time of extrusion, more preferably 2.0 to 3.5 g/10 min.

The vicat softening temperature of the ethylene-vinyl acetate copolymer is preferably 60 to 110° C. to attain a stable particle size during synthesis. More preferably, the vicat softening temperature is 60 to 90° C.

The ethylene-vinyl acetate copolymer as mentioned above is available as a commercial product.

The linear low-density polyethylene used in the invention preferably has a linear polyethylene chain and a short-chain branched structure having 2 to 6 carbon atoms. For example, an ethylene-α-olefin copolymer can be given.

The density of the linear low-density polyethylene is normally 0.88 to 0.945, preferably 0.94 or lower, more preferably 0.93 or lower.

The melt mass flow rate of the linear low-density polyethylene is preferably 1.5 to 4.0 g/10 min, more preferably 1.5 to 3.0 g/10 min. If the melt mass flow rate is outside the range of 1.5 to 4.0 g/10 min, melt-kneading tends to be difficult.

The vicat softening temperature of the linear low-density polyethylene is preferably 80 to 120° C., more preferably 90 to 100° C. If the vicat softening temperature is lower than 80° C., the fugacity of the foaming agent tends to increase when forming an expandable polyethylene resin particle. If a vicat softening temperature exceeds 120° C., granulation during synthesis tends to be difficult.

The method for measuring the above-mentioned properties of the linear low-density polyethylene is the same as that of an ethylene-vinyl acetate copolymer.

The above-mentioned linear low-density polyethylene is available as a commercial product.

As for the components constituting the nucleus particle (resins for the nucleus particle), the above-mentioned two polyethylene resins are indispensable. Furthermore, an ethylene polymer such as an ethylene-propylene copolymer, an ethylene-vinyl chloride copolymer and an ethylene-acrylic ester copolymer may be used singly or in combination of two or more.

As for the components constituting the nucleus particle (resins for the nucleus particle), it is preferable to use an acrylonitrile-styrene copolymer in combination in view of decreasing the fugacity of a foaming agent. The weight average molecular weight of the acrylonitrile-styrene copolymer is preferably 70,000 to 400,000, more preferably 100,000 to 250,000. If the weight average molecular weight is smaller than 70,000, retainability of a foaming agent tends to decrease. If the weight average molecular weight exceeds 400,000, foaming properties and moldability tend to decrease.

The resins constituting the nucleus particle are preferably blended in such a ratio of 10 to 80 wt % of the ethylene-vinyl acetate copolymer and 90 to 20 wt % of the linear low-density polyethylene, the total amount thereof being 100 wt %. More preferably, they are blended in such a ratio of 10 to 60 wt % of the ethylene-vinyl acetate copolymer and 90 to 40 wt % of the linear low-density polyethylene.

Outside the above-mentioned preferred range, the resultant molded product tends to be easily broken and strength properties thereof tend to decrease.

In the case where an acrylonitrile-styrene copolymer is added thereto, the resins constituting the nucleus particle are preferably blended in such a ratio of 10 to 80 wt % of the ethylene-vinyl acetate copolymer, 10 to 80 wt % of the linear low-density polyethylene and 1 to 50 wt % of the acrylonitrile-styrene copolymer, the total amount thereof being 100 wt %. More preferably, they are blended in such a ratio of 10 to 80 wt % of the ethylene-vinyl acetate copolymer, 40 to 88 wt % of the linear low-density polyethylene and 2 to 20 wt % of the acrylonitrile-styrene copolymer.

Outside the above-mentioned preferred range, a foaming agent tends to scatter quickly, or strength properties tend to decrease.

The nucleus particles used in the invention may contain a bubble adjuster, a pigment, a slip agent, an antistatic, a flame retardant and the like, as long as the effects of the invention are not impaired.

The nucleus particle used in the invention is preferably prepared by blending the above-mentioned resins and conducting melt kneading, followed by fine granulation. The melt kneading can be conducted by an extruder. At this time, in order to knead the resins uniformly, it is preferred that the resin components be mixed in advance, followed by extrusion. The resin components can be mixed by a conventionally known means. For instance, a mixer such as a ribbon blender, a V-blender, a Henschel mixer or a Lodige mixer can be employed.

At the time of blending, a bubble adjuster may be added for adjusting the bubbles in the foam. As the bubble adjuster, a higher fatty acid bisamide, a metal salt of a higher fatty acid, an inorganic material or the like may be employed.

When using an organic material such as the higher fatty acid bisamide or the metal salt of a fatty acid, it is preferably added within an amount ratio of 0.01 to 2 wt %, relative to the total amount of the resins for the nucleus particle. If it is added at less than 0.01 wt %, an effect sufficient for making small sized bubbles tends not to be attained. If it exceeds 2 wt %, the size of the bubbles tends to be extremely small, and the resins are melted at the time of molding, and then, outer appearance of the resultant molded product tends to deteriorate.

When using an inorganic material, it is preferably added within an amount ratio of 0.1 to 5 wt %, relative to the total amount of the resins for the nucleus particle. If it is added in an amount less than 0.1 wt %, an effect sufficient for making small sized bubbles tends not to be attained. If it exceeds 5 wt %, the size of bubbles tends to be extremely small, and the resins are melted at the time of molding, and then, outer appearance of the resultant molded product tends to deteriorate.

Fine granulation of the nucleus particle can be conducted by the above-mentioned extruder. However, the other methods may be used as long as the desired particle diameter can be obtained. The particle diameter is preferably 0.1 to 3.0 mm, more preferably 0.4 to 2.0 mm. If the particle diameter is smaller than 0.1 mm, retainability of a foaming agent tends to decrease. If it exceeds 3.0 mm, mold filling property tends to deteriorate at the time of molding.

In the case of using an extruder, the particle diameter can be controlled, for example, by extruding the resins through bores which have a bore diameter within a range of the particle diameter and cutting the resins in a length within a range of the particle diameter using a pelletizing machine.

The nucleus particles made of the above-mentioned polyethylene resin are normally dispersed in an aqueous medium to form a suspension. Dispersing the nucleus particles into the aqueous medium is normally carried out using a machine equipped with an agitating blade, and no limitation is applied to the conditions of dispersion. As the aqueous medium used in the invention, ion exchange water, for example, may be mentioned.

The nucleus particles are preferably dispersed in an aqueous medium together with a dispersing agent. The dispersing agent includes organic dispersing agents such as polyvinyl alcohol, polyvinyl pyrrolidone and methyl cellulose, and hardly soluble inorganic salts such as magnesium phosphate and tricalcium phosphate.

Further, a surfactant may be used. The surfactant includes sodium oleate, sodium dodecylbenzenesulfonate, and anionic surfactants and nonionic surfactants which are generally used in suspension polymerization.

Subsequently, a styrene monomer or the monomer mixture is added to the above-mentioned suspension, followed by polymerization. Acrylic monomer or the like may be used other than styrene monomer. In order to uniformly polymerize styrene in the polyethylene resin particle, the styrene monomer or the monomer mixture is preferably impregnated into the polyethylene resin nucleus particle, followed by polymerization. When styrene is polymerized after styrene is impregnated into the polyethylene resin nucleus particle, cross-linking is formed together with the polymerization. A polymerization initiator and a cross-linking agent are used, if necessary. The polymerization initiator and/or the cross-linking agent are preferably dissolved in the styrene monomer or the monomer mixture in advance.

Here, during the course of polymerization of the monomers, polyethylene may be cross-linked. Accordingly, "polymerization" may include "cross-linking" herein.

Of the monomers used in the invention, the styrene monomer is one or two or more monomers selected from styrene and styrene derivatives. Examples of the styrene derivatives include methacrylic esters such as methyl methacrylate and ethyl methacrylate, acrylic monomers such as the corresponding acrylic ester, α-methyl styrene and vinyl toluene.

In the monomer mixture containing a styrene monomer, examples of monomers other than the styrene monomer include non-styrene-based acrylic monomers, vinyl cyanides such as acrylonitrile and methacrylonitrile, and vinyl chloride. The ratio of styrene and/or styrene derivatives in the monomer mixture is preferably 50 wt % or more, more preferably 80 wt % or more, further preferably 90 wt % or more, relative to the total amount of the monomers.

As a preferred example of the monomer mixture, styrene and butyl acrylate can be used. In this case, butyl acrylate is preferably contained in a ratio of 0.5 to 10 wt %, relative to the total amount of the expandable polyethylene resin particle. If it is contained in a ratio of less than 0.5 wt %, higher expandability may not be attained. If it exceeds 10 wt %, the expanded particles may highly constrict and no higher expandability can be obtained contrary to the expectation.

In order to have good expandability, butyl acrylate is preferably used in a ratio of 1 to 8 wt %, more preferably 2 to 5 wt %.

The nucleus particles and the styrene monomer or the monomer mixture are preferably blended in a weight ratio of the nucleus particles per the styrene monomer or the monomer mixture of 10/90 to 60/40, more preferably 20/80 to 50/50. If the weight ratio exceeds 60/40, it tends to be difficult for the particles to be conglobated. On the other hand, if the weight ratio is less than 10/90, impact resistance, heat resistance and chemicals resistance, which are the characteristics of polyethylene resins, tend to deteriorate.

The polymerization initiator used in the invention is not particularly limited, so long as it is used for suspension polymerization of a styrene monomer. For instance, one or two or more kinds selected from organic peroxides such as t-butyl peroxide, benzoyl peroxide, t-butyl peroxy-2-ethylhexylcarbonate and t-butyl perbenzoate, and azo compounds such as azobisisobutyronitrile may be used.

The polymerization initiator may be added after being dissolved in a solvent and the resulting solution may be impregnated into the polyethylene resin nucleus particle. In this case, as the solvent in which the polymerization initiator is dissolved, aromatic hydrocarbons such as ethyl benzene and toluene, and aliphatic hydrocarbons such as heptane and octane are employed. When using the solvent, it is normally used in a ratio of 3 wt % or less, relative to the styrene monomer or the monomer mixture.

The amount used of the polymerization initiator varies depending upon the kind thereof, and in general. However, it is preferably used within a range of 0.1 to 1.0 wt %, relative to the monomers.

A preferred cross-linking agent is one which does not decompose at a polymerization temperature but decomposes at a cross-linking temperature. For example, peroxides such as dicumyl peroxide, 2,5-t-butyl perbenzoate and 1,1-bis-tert-butyl peroxycyclohexane may be mentioned. The cross-linking agent is used singly or in combination of two or more. It is preferably used in an amount of 0.1 to 5 wt %, relative to the monomers.

Incidentally, in the invention, the polymerization initiator and the cross-linking agent may be the same compound.

In the invention, as the bubble adjuster, aliphatic acid monoamides such as oleic acid amide and stearic acid amide, and aliphatic acid bisamides such as methylene bisstearic acid amide and ethylene bisstearic acid amide may be used after being dissolved in the styrene monomer or the monomer mixture, or the above-mentioned solvent. In this case, the bubble adjustor is preferably used in a ratio of 0.01 to 2 parts by weight, relative to 100 parts of the styrene monomers or the monomer mixture thereof.

The monomers in which the polymerization initiator and/or the cross-linking agent is contained, as required, may be added all at once or in parts.

Although the polymerization temperature varies depending upon the kind of polymerization initiator used, it is preferably within a temperature range of 60 to 105° C. Also, although the cross-linking temperature varies depending upon the kind of the cross-linking agent used, it is preferably within a temperature range of 100 to 150° C.

Next, a foaming agent is impregnated into the resin particles during polymerization or after polymerization. The foaming agent is pressed into a container, normally heated to a temperature of the softening point or higher of the resin particle and impregnated into the resin particle.

As the foaming agent, one which does not dissolve the above-mentioned resin particle or one which slightly swells the resin particle is preferred. Specifically, an aliphatic hydrocarbon such as propane, n-butane, isobutane, n-pentane, isopentane or cyclopentane may be used. They may be used singly or in combination of two or more.

These foaming agents are normally used in a ratio of 5 to 30 wt %, relative to the resin particle before impregnation with the foaming agent.

Impregnation of the foaming agent is carried out preferably at a temperature of 80 to 140° C., more preferably 90 to 120° C. If the temperature of impregnation of the foaming agent is lower than 80° C., the foaming agent tends to be insufficiently impregnated. On the other hand, if it exceeds 140° C., the resin particle tends to be flat. The foaming agent is eliminated from the polymerization system after the impregnation is completed, to obtain the expandable polyethylene resin particle.

The expandable polyethylene resin particle is dehydrated and dried, then, may be coated with a surface coating agent, if necessary. For example, zinc stearate, stearic acid triglyceride, stearic acid monoglyceride, hardened castor oil and an antistatic may be mentioned.

The expandable polyethylene resin particle is improved in the retainability of a foaming agent, further, is excellent in expandability, even when the foaming agent scatters.

An expanded polyethylene bead is obtained by foaming the expandable polyethylene resin particle of the invention.

The ethylene resin foam-molded product of the invention is obtained by foam-molding the above-mentioned expandable polyethylene resin particles or the expanded polyethylene beads.

The ethylene resin foam-molded product of the invention exhibits high strength while keeping impact resistance, deflection and repeated stress-strain, which are characteristics of the expanded olefin resin molded product.

EXAMPLES

Hereinafter, the invention will be explained more in detail with reference to examples. However, the invention is not restricted by the below-mentioned examples.

Measuring methods for resin properties used in Examples and Comparative Examples are as follows:

Density

It was measured using a density gauge (density gradient tube of water and alcohol system) at a temperature of 23° C.

Melt Mass Flow Rate

It was measured using a melt indexer under the following measuring conditions:

Temperature: 200° C., Loading: 5 kg, 10 minutes

Differential scanning calorimeter (DSC): Thermo PLUS 8230

Sample: 10 mg (Standard: 10 mg of aluminum oxide)

Programming rate: 10° C./min, Preset temperature: 200° C., Measuring time: 7 minutes Vicat Temperature It was measured by means of a differential scanning calorimeter (DSC).

Weight Average Molecular Weight

Measurement was carried out under the following conditions, and the weight average molecular weight was obtained by converting the measurement result using a standard polystyrene calibration curve.

Measuring machine: manufactured by Hitachi, Ltd. Eluent: THF

Rate of flow: 2 mL/min Detector: 250 nm

Column: Two GL-R400Ms manufactured by Hitachi Chemical Co., Ltd.

Example 1

(1) Preparation of Nucleus Particles

Seven-hundred eighty grams of an ethylene-vinyl acetate copolymer containing 5 wt % of vinyl acetate (manufactured by Toso Company, Limited., Ultrathene 515, density: 0.925, melt mass flow rate: 2.5 g/10 min, vicat softening temperature: 80° C.) and 2100 g of a linear low-density polyethylene resin (manufactured by Toso Company, Limited., Nipolon 9P51A, density: 0.91, melt mass flow rate: 2.0 g/10 min, vicat softening temperature: 96° C.) and 120 g of acrylonitrile-styrene copolymer particles (manufactured by Denki Kagaku Kogyo Kabushiki Kaisha, AS-XGS, weight average molecular weight: 127,000) were put in Henschel mixer (manufactured by Mitsui Miike Kakoki, FM10B) and mixed at a rate of 2000 rpm for one minute.

Subsequently, the mixture for resin particles was melt-extruded by an extruder (manufactured by Ikegai Ltd., PCM-30, biaxial type, die diameter: 3 mm, cylinder temperature: 230° C., head temperature: 230° C.). After cooling and solidifying, the extruded product was cut into a size of 0.7 to 1.1 mm (average: 0.9 mm) by means of a pelletizing machine (manufactured by Nakatani Kikai, cutter speed scale: 0.5, roll speed scale: 0.5), to obtain polyethylene resin nucleus particles.

(2) Production of Expandable Polyethylene Resin Particles

A five-liter pressure-resistant stirring container was charged with 385 g of the above-mentioned polyethylene resin particles, 2100 g of deionized water, 11 g of tricalcium phosphate and 0.025 g of sodium dodecylbenzenesulfonate, and the mixture was stirred.

Subsequently, 0.55 g of t-butyl peroxide, 3.4 g of benzoyl peroxide and 11.8 g of 1,1-bis-t-butyl peroxycyclohexane were dissolved in 715 g of styrene (monomer). The styrene solution was added to the above-mentioned container and kept at a temperature of 20° C. for 0.5 hours.

Then, the mixture was heated up to a temperature of 88° C. and kept at this temperature for 6 hours to polymerize the monomers. Subsequently, 1.1 g of tricalcium phosphate, 0.03 g of sodium dodecylbenzenesulfonate and 4.4 g of calcium carbonate were added thereto, then, the mixture was heated up to a temperature of 130° C. and kept at this temperature for 10 hours to conduct cross-linking.

Then, the reaction solution was cooled to a temperature of 105° C. Fifty five grams of cyclohexane and 132 g of butane (weight ratio of isobutane per n-butane is 4/6) was compressively added into the container and kept for 6 hours.

After cooling the reaction solution to room temperature, polyethylene resin particles into which the foaming agent was impregnated were taken out from the container, and dehydrated and dried. Subsequently, the polymer particles were classified by sieves having a pore size of 3.35 mm or 1.7 mm, to obtain 1100 g of the resin particles. To the resultant resin particles, 2.9 g of fatty acid monoglyceride was added and mixed to obtain expandable polyethylene resin particles.

The resultant expandable polyethylene resin particles were heated with steam by a foaming machine for expandable styrene resin (manufactured by Hitachi Chemical Techno Plant Co., Ltd., HBP-500LW), to conduct preliminary foaming to obtain expanded beads having a density of 38 mL/g.

Then, the expanded beads were aged for about 12 hours, followed by molding with a molding machine for expanded styrene resin (manufactured by Daisen Industry Co., Ltd., VS-300) under a molding pressure of 0.13 MPa, to obtain an expanded polyethylene resin molded product.

The resultant expandable polyethylene resin particles were left to stand in the open state at a temperature of 20° C. for 48 hours, then, the content of the foaming agent and the degree of foaming were measured by the following methods. Table 1 shows the results.

Content of Foaming Agent

The resin particles were heated at a temperature of 200° C. for 10 minutes, and the content of the foaming agent was calculated by the following expression:

Amount of foaming agent(wt %)=[(Weight before heating)−(Weight after heating)]/(Weight before heating)

Degree of Foaming

The degree of foaming is a bulk magnification after foaming the resin particles in boiled water at a temperature of 100° C. for 3 minutes.

The resultant foam-molded product having a foaming magnification of 40 was evaluated according to the following methods. Table 1 shows the results.

Outer Appearance of Molded Product

Outer appearance of the molded product was judged with visual observation on an ascending scale of 1 to 5. The best outer appearance was evaluated as "5", and the most inferior one as "1".

Twenty-Five % Compressive Strength

It was measured in accordance with JIS K7220.

Bending Fracture Length

It was measured in accordance with JIS A9511.

Here, fracture length under a bending strength indicated in Table 1 was 65 mm at the longest, therefore, measurement at a bending strength over 65 mm could not be carried out (namely, it shows that a sample piece was not broken).

Example 2

Expandable polyethylene resin particles and a molded product were obtained in the same manner as in Example 1 except that in (1) of Example 1, 780 g of an ethylene-vinyl acetate copolymer in which vinyl acetate was contained in an amount of 15 wt % (manufactured by Toso Company Limited., Ultrathene 626, density: 0.936, melt mass flow rate: 3.0 g/10 min, vicat softening temperature: 65° C.), 2100 g of a linear low-density polyethylene (manufactured by Toso Company Limited., Nipolon 9P51A) and 120 g of acrylonitrile-styrene copolymer particles (manufacture by Denki Kagaku Kogyo Kabushiki Kaisha, AS-XGS, weight average molecular weight: 127,000) were used.

Table 1 shows the evaluation results.

Example 3

Expandable polyethylene resin particles and a molded product were obtained in the same manner as in Example 1 except that in (1) of Example 1, 1440 g of an ethylene-vinyl acetate copolymer in which vinyl acetate was contained in an amount of 5 wt % (manufactured by Toso Company Limited., Ultrathene 515), 1440 g of a linear low-density polyethylene (manufactured by Toso Company Limited., Nipolon 9P51A) and 120 g of acrylonitrile-styrene copolymer particles (manufactured by Denki Kagaku Kogyo Kabushiki Kaisha, AS-XGS, weight average molecular weight: 127,000) were used.

Table 1 shows the evaluation results.

Example 4

Expandable polyethylene resin particles and a molded product were obtained in the same manner as in Example 1 except that in (1) of Example 1, 1350 g of an ethylene-vinyl acetate copolymer in which vinyl acetate was contained in an amount of 5 wt % (manufactured by Toso Company Limited., Ultrathene 515), 1350 g of a linear low-density polyethylene (manufactured by Toso Company Limited., Nipolon 9P51A) and 300 g of acrylonitrile-styrene copolymer particles (manufacture by Denki Kagaku Kogyo Kabushiki Kaisha, AS-XGS, weight average molecular weight: 127,000) were used.

Table 1 shows the evaluation results.

Comparative Example 1

Expandable polyethylene resin particles were obtained in the same manner as in Example 1 except that in (1) of Example 1, no linear low-density polyethylene and no acrylonitrile-styrene copolymer particles, and 3000 g of an ethylene-vinyl acetate copolymer in which vinyl acetate was contained in an amount of 5 wt % (manufactured by Toso Company Limited., Ultrathene 515) were used.

Table 1 shows the evaluation results. Now, in Comparative Example 1, gas scattered too fast to attain sufficient foaming of the particles and to conduct foam-molding, and therefore, a molded product was not obtained.

Comparative Example 2

Expandable polyethylene resin particles and a molded product were obtained in the same manner as in Example 1 except that in (1) of Example 1, no ethylene-vinyl acetate copolymer in which vinyl acetate was contained in an amount of 5 wt %, 2880 g of a linear low-density polypropylene particles (manufactured by Toso Company Limited, Nipolon 9P51A) and 120 g of acrylonitrile-styrene copolymer resin particles (manufactured by Denki Kagaku Kogyo Kabushiki Kaisha, AS-XGS, weight average molecular weight: 127,000) were used.

Table 1 shows the evaluation results.

TABLE 1

|  |  | Example 1 | Example 2 | Example 3 | Example 4 | Comp. Example 1 | Comp. Example 2 |
|---|---|---|---|---|---|---|---|
| Nucleus particles | Ethylene-vinyl acetate copolymer containing 5% of vinyl acetate (wt %) | 26 | — | 48 | 45 | 100 | — |
|  | Ethylene-vinyl acetate copolymer containing 15% of vinyl acetate (wt %) | — | 26 | — | — | — | — |
|  | Linear low-density polyethylene (wt %) | 70 | 70 | 48 | 45 | — | 96 |
|  | Acrylonitrile-styrene copolymer (wt %) | 4 | 4 | 4 | 10 | — | 4 |
| Expandable particles | Weight ratio of nucleus particles/styrene |  |  |  | 35/65 |  |  |
| Evaluation of expandable particles | Amount of foaming agent (wt %) | 7.9 | 7.2 | 7.8 | 7.6 | 4.0 | 7.7 |
|  | Degree of foaming | 45 | 37 | 40 | 39 | 8 | 38 |
| Evaluation of foam-molded product | Outer appearance | 5 | 5 | 5 | 5 | Foam-molding could not be performed. | 5 |
|  | 25% Compressive strength (Mpa) | 0.15 | 0.15 | 0.14 | 0.13 |  | 0.09 |
|  | Fracture length under bending strength (mm) | 65 | 65 | 65 | 60 |  | 30 |

Example 5

(1) Preparation of Nucleus Particles

Expandable polyethylene resin particles were obtained in the same matter as in (1) of Example 1 except that in (1) of Example 1, 780 g of an ethylene-vinyl acetate copolymer in which vinyl acetate was contained in an amount of 15 wt % (manufactured by Toso Company Limited., Ultrathene 626), 2100 g of a linear low-density polyethylene (manufactured by Toso Company Limited., Nipolon 9P51A) and 120 g of acrylonitrile-styrene copolymer particles (manufactured by Denki Kagaku Kogyo Kabushiki Kaisha, AS-XGS) were used.

(2) Production of Expandable Polyethylene Resin Particles

An expanded polyethylene molded product was obtained in the same manner as in (2) of Example 1 except that in (2) of Example 1, 682 g of styrene and 33 g of butyl acrylate as monomers were used.

The resultant expandable polyethylene resin particles and expanded polyethylene resin molded product were evaluated in the same manner as in Example 1. Table 2 shows the results.

Example 6

Expandable polyethylene resin particles and a foam-molded product were obtained in the same manner as in Example 5 except that in (2) of Example 5, 671 g of styrene and 44 g of butyl acrylate were used.

Table 2 shows the evaluation results.

Example 7

Expandable polyethylene resin particles and a foam-molded product were obtained in the same manner as in Example 5 except that in (2) of Example 5, 693 g of styrene and 22 g of butyl acrylate were used.

Table 2 shows the evaluation results.

Example 8

Expandable polyethylene resin particles and a foam-molded product were obtained in the same manner as in Example 5 except that in (2) of Example 5, 660 g of styrene and 55 g of butyl acrylate were used.

Table 2 shows the evaluation results.

TABLE 2

| | | Example 5 | Example 6 | Example 7 | Example 8 |
|---|---|---|---|---|---|
| Nucleus particles | Ethylene-vinyl acetate copolymer containing 15% of vinyl acetate (wt %) | | | 70 | |
| | Linear low-density polyethylene (wt %) | | | 26 | |
| | Acrylonitrile-styrene copolymer (wt %) | | | 4 | |
| Expandable particles | Weight ratio of nucleus particles/styrene and butyl acrylate | | | 35/65 | |
| | Amount of butyl acrylate (wt %) | 3 | 4 | 2 | 5 |
| Evaluation of expandable particles | Amount of foaming agent (wt %) | 6.5 | 6.2 | 6.4 | 6.3 |
| | Degree of foaming | 43 | 41 | 38 | 37 |
| Evaluation of foam-molded product | Outer appearance | 5 | 5 | 5 | 5 |
| | 25% Compressive strength (Mpa) | 0.15 | 0.13 | 0.15 | 0.13 |
| | Fracture length under bending strength (mm) | 65 | 65 | 65 | 65 |

INDUSTRIAL APPLICABILITY

The expandable polyethylene resin particles and the foam-molded product formed therefrom can be used for various uses such as a food container, a packing material, a cushioning material and a heat insulating material.

The invention claimed is:

1. A method for producing an expandable resin particle including polyethylene, which comprises the steps of:
   polymerizing a styrene monomer or a monomer mixture containing a styrene monomer to a nucleus particle comprising an ethylene-vinyl acetate copolymer, a linear low-density polyethylene and an acrylonitrile-styrene copolymer, and
   impregnating the resultant particle with a foaming agent.

2. The method for producing an expandable resin particle including polyethylene according to claim 1, wherein
   the ethylene-vinyl acetate copolymer has a density of 0.95 g/cm$^3$ or lower, a melt mass flow rate of 1.5 to 4.0 g/10 min and a vicat softening temperature of 60 to 110° C., and
   the content of vinyl acetate in the ethylene-vinyl copolymer is 3 to 20 wt %.

3. The method for producing an expandable resin particle including polyethylene according to claim 1, wherein
   the linear low-density polyethylene has a density of 0.94 g/cm$^3$ or lower, a melt mass flow rate of 1.5 to 4.0 g/10 min and a vicat softening temperature of 80 to 120° C.

4. The method for producing an expandable resin particle including polyethylene according to claim 1, wherein the acrylonitrile-styrene copolymer has a weight-average molecular weight of 70,000 to 400,000.

5. The method for producing an expandable resin particle including polyethylene according to claim 1, wherein
   the nucleus particle essentially consists of, in 100 wt % in total,
   the ethylene-vinyl acetate copolymer of 10 to 80 wt %,
   the linear low-density polyethylene of 10 to 80 wt % and
   the acrylonitrile-styrene copolymer of 1 to 50 wt %.

6. The method for producing an expandable resin particle including polyethylene according to claim 1, wherein
   the weight ratio of the nucleus particle per the styrene monomer or the monomer mixture is 10/90 to 60/40.

7. The method for producing an expandable resin particle including polyethylene according to claim 1, wherein
   a polymerization initiator and a cross-linking agent are previously dispersed in the styrene monomer or the monomer mixture.

8. The method for producing an expandable resin particle including polyethylene according to claim 1, wherein
   the styrene monomer or the monomer mixture is a combination of styrene and butyl acrylate.

9. The method for producing an expandable resin particle including polyethylene according to claim 8, wherein
   the expandable resin particle contains butyl acrylate in a ratio of 0.5 to 10 wt %.

10. The method for producing an expandable resin particle including polyethylene according to claim 1, wherein
    the nucleus particle has a particle diameter of 0.1 to 3.0 mm.

11. An expandable resin particle including polyethylene, obtainable by the method for producing an expandable resin particle including polyethylene according to claim 1.

12. An expandable resin particle including polyethylene, which comprises a polymer of an ethylene-vinyl acetate copolymer, a linear low-density polyethylene, an acrylonitrile-styrene copolymer, and a polymer of a styrene monomer or a monomer mixture containing a styrene monomer, and is impregnated with a foaming agent.

13. The expandable resin particle including polyethylene according to claim 12, which consists of 10 to 80 wt % of the ethylene-vinyl acetate copolymer, 10 to 80 wt % of the linear low-density polyethylene, and 1 to 50 wt % of the acrylonitrile-styrene copolymer, relative to the total of these components of 100 wt %, and in which the weight ratio of the total amount of these components per the polymer of the styrene monomer or the monomer mixture is 10/90 to 60/40.

14. The expandable resin particle including polyethylene according to claim 12, wherein the polymer of the styrene monomer or the monomer mixture is a copolymer of styrene and butyl acrylate.

15. An expanded bead obtainable by foaming the expandable resin particle including polyethylene according to claim 11.

16. A resin molded product obtainable by foam-molding expanded beads according to claim 15.

* * * * *